(12) United States Patent
Seto et al.

(10) Patent No.: US 9,902,378 B2
(45) Date of Patent: Feb. 27, 2018

(54) BRAKE SYSTEM

(71) Applicant: HITACHI AUTOMOTIVE SYSTEMS, LTD., Hitachinaka-shi, Ibaraki (JP)

(72) Inventors: Shinji Seto, Tokyo (JP); Tatsuro Kobune, Hitachinaka (JP); Takayasu Sakashita, Hitachinaka (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 104 days.

(21) Appl. No.: 14/833,561

(22) Filed: Aug. 24, 2015

(65) Prior Publication Data

US 2016/0052496 A1    Feb. 25, 2016

(30) Foreign Application Priority Data

Aug. 25, 2014  (JP) ................. 2014-170299

(51) Int. Cl.
  *F16D 55/08*     (2006.01)
  *B60T 8/171*     (2006.01)
  (Continued)

(52) U.S. Cl.
  CPC ............... *B60T 8/171* (2013.01); *B60T 8/17* (2013.01); *B60T 13/741* (2013.01);
  (Continued)

(58) Field of Classification Search
  CPC .......... B60T 8/171; B60T 8/17; B60T 13/741; F16D 55/225; F16D 65/18; F16D 65/183; F16D 2121/24; F16D 55/226
  (Continued)

(56) References Cited

U.S. PATENT DOCUMENTS

| 7,052,093 B2* | 5/2006 | Suzuki | B60T 13/741 |
| | | | 188/162 |
| 2005/0077783 A1* | 4/2005 | Suzuki | B60T 7/107 |
| | | | 303/89 |

(Continued)

FOREIGN PATENT DOCUMENTS

JP    2008-056090 A    3/2008

OTHER PUBLICATIONS

Translation of JP 2008056090 specification obtained from www.worldwide.espacenet.com dated May 9, 2017.*

*Primary Examiner* — Pamela Rodriguez
(74) *Attorney, Agent, or Firm* — Volpe and Koenig, P.C.

(57) ABSTRACT

An object of the present invention is to obtain a brake system that can generate appropriate braking force without influence of temperature. A brake system includes: a piston that presses pressing members; a motor that moves the piston; a current detection unit that detects current flowing in the motor; a storage unit that stores a correspondence relation between idle running current and motor stopping current; a motor stopping current setting unit that sets the motor stopping current using the storage unit and the idle running current; and a control unit that stops to supply the current to the motor when the current flowing in the motor reaches the motor stopping current. The correspondence relation is set so that the rate of change of the motor stopping current relative to the idle running current becomes smaller when the idle running current is small than that when it is large.

9 Claims, 10 Drawing Sheets

(51) Int. Cl.
    *B60T 8/17*          (2006.01)
    *F16D 55/225*       (2006.01)
    *F16D 65/18*        (2006.01)
    *B60T 13/74*        (2006.01)
    *F16D 55/226*       (2006.01)
    *F16D 121/24*       (2012.01)

(52) U.S. Cl.
    CPC ......... *F16D 55/225* (2013.01); *F16D 55/226* (2013.01); *F16D 65/18* (2013.01); *F16D 2121/24* (2013.01)

(58) Field of Classification Search
    USPC ...... 188/72.1, 72.3, 157, 158, 162; 303/2, 3, 303/15, 20, 68, 124, 199; 701/70, 78, 83
    See application file for complete search history.

(56) References Cited

U.S. PATENT DOCUMENTS

2014/0095042 A1*   4/2014   Sakashita .............. B60T 13/588
                                                        701/70
2014/0142828 A1*   5/2014   Harada ................ B60T 13/146
                                                        701/70
2016/0032995 A1*   2/2016   Nishino ................ F16D 55/225
                                                       188/72.3

\* cited by examiner

BRAKE SYSTEM

CLAIM OF PRIORITY

The present application claims priority from Japanese Patent application serial No. 2014-170299, filed on Aug. 25, 2014, the content of which is hereby incorporated by reference into this application.

FIELD OF THE INVENTION

The present invention relates to a brake system used for braking a vehicle.

BACKGROUND OF THE INVENTION

An electric power brake that brakes a vehicle by pressing pressing members such as brake pads or drum shoes to a rotary member such as a rotor or a brake drum using the rotation of a motor has been proposed as a brake system from the past. There is a need for the electric power brake to minimize braking force that exceeds the required braking force.

Japanese Unexamined Patent Application Publication No. 2008-56090 describes that the atmosphere temperature is detected to change a set current value proportional to the atmosphere temperature because the load applied to an actuator is increased at low temperatures and predetermined braking force cannot be obtained even if current corresponding to the set current value is supplied.

SUMMARY OF THE INVENTION

However, a torque constant becomes small at high temperatures. Thus, if the set current value is merely changed proportional to the atmosphere temperature, there is a possibility that the predetermined braking force cannot be obtained.

An object of the present invention is to provide an electric power brake that can generate appropriate braking force even when temperature is changed.

In order to address the above-described problems, the present invention adopts, for example, the configurations described in claims. The present invention includes a plurality of devices to address the above-described problems, and provides, as an example, a brake system that presses pressing members to a rotary member to control the rotation of the rotary member, the system including: a piston that can be moved in the pressing direction of the pressing members; a motor that moves the piston with the supply of power source; a current detection unit that detects current flowing in the motor; a storage unit that stores a correspondence relation between idle running current flowing in the motor from the time the piston is started to move to the time the pressing members are started to be pressed and motor stopping current serving as a standard when the supply of current to the motor is stopped; a motor stopping current setting unit that sets the motor stopping current by referring to the storage unit using the idle running current; and a control unit that stops to supply the current to the motor when the current flowing in the motor reaches the motor stopping current, wherein the correspondence relation is set in the storage unit so that the rate of change of the motor stopping current relative to the idle running current becomes smaller when the idle running current is small than that when the idle running current is large.

According to the present invention, it is possible to provide an electric power brake that can generate appropriate braking force even when temperature is changed.

DETAILED DESCRIPTION OF THE PREFERRED EMBODIMENTS

Hereinafter, embodiments of a brake system according to the present invention will be described using the drawings.

First Embodiment

Figure 1:
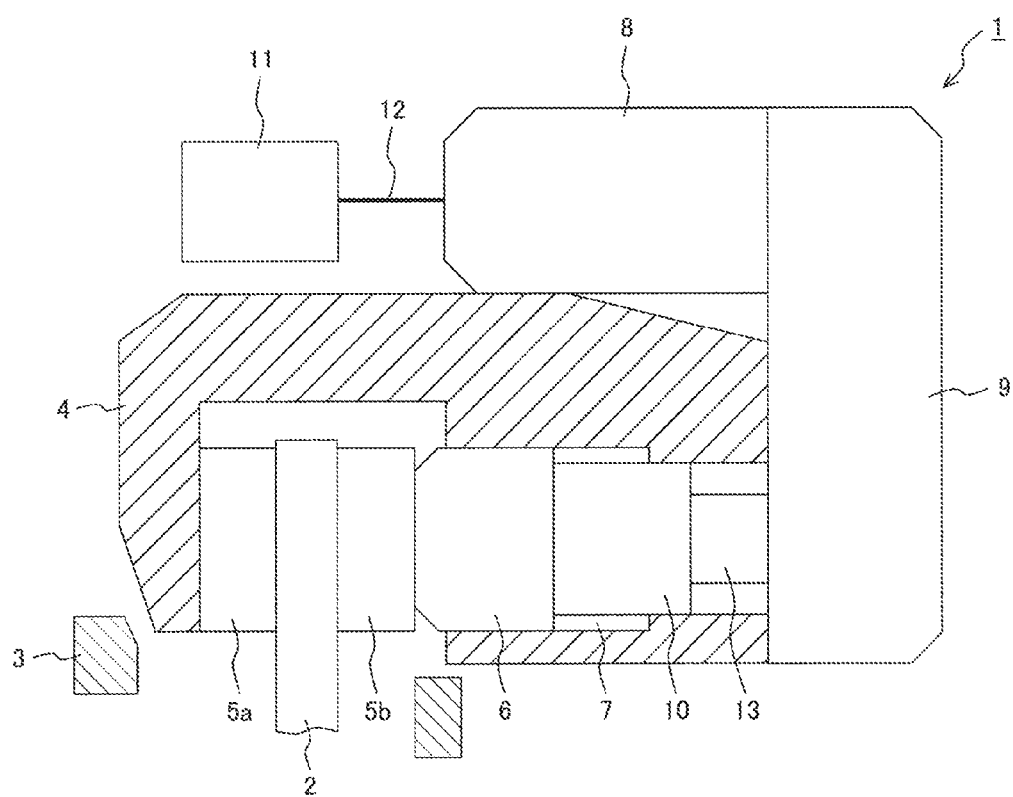
FIG. 1 is a configuration diagram for showing an example of a brake system to which the present invention is applied.

First, a first embodiment of a brake system according to the present invention will be described using FIG. 1 to FIG. 8. FIG. 1 is a configuration diagram for showing an example of the brake system to which the present invention is applied, and FIG. 2 is a diagram for showing a configuration example of a vehicle having the brake system.

Figure 2:
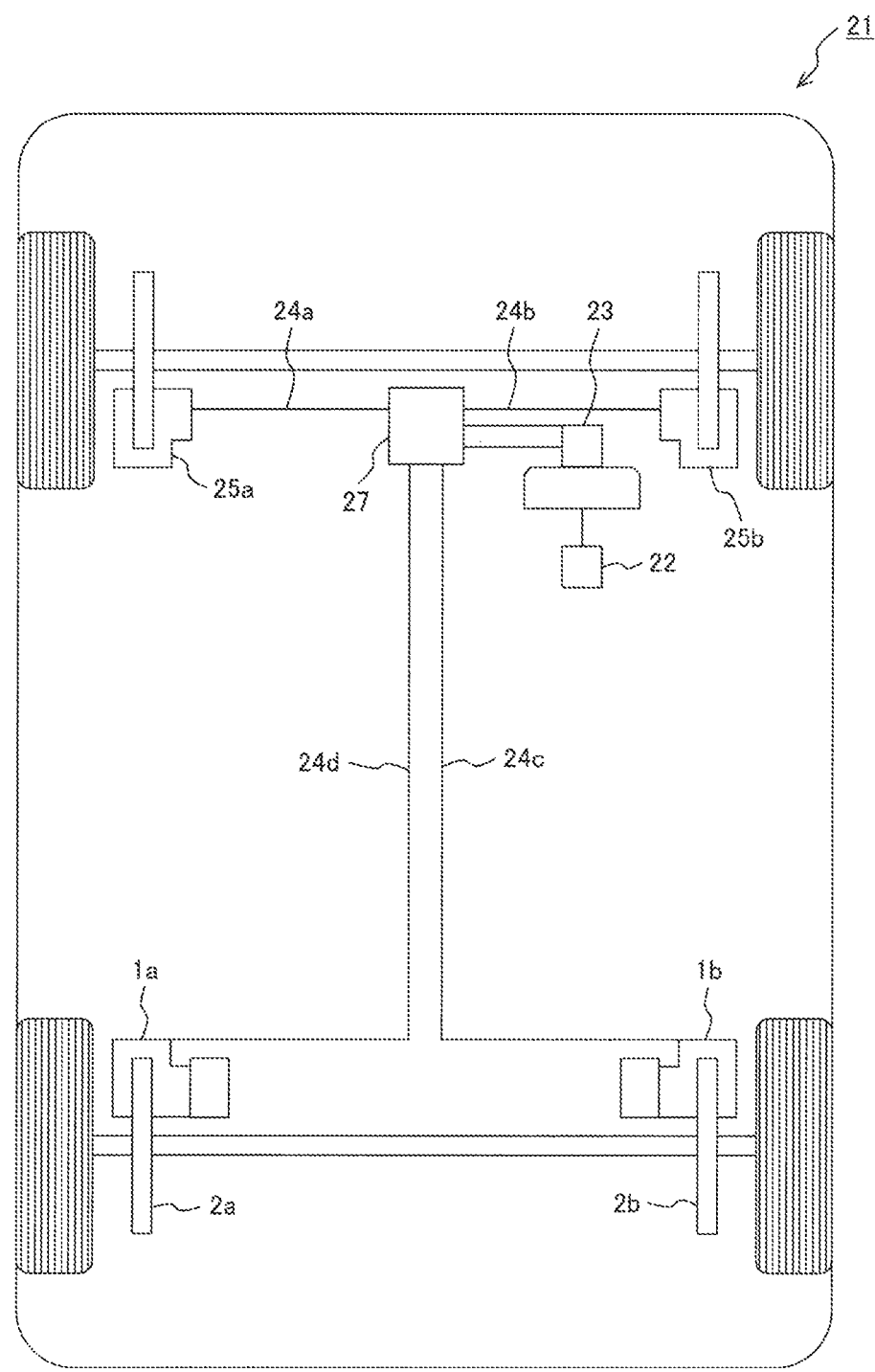
FIG. 2 is a diagram for showing a configuration example of a vehicle having the brake system.

As shown in FIG. 2, the present invention is applied to disc brake systems 1a and 1b (the configurations of the systems 1a and 1b are the same) which are disposed at right and left rear wheel parts of a vehicle 21. In addition to the disc brake systems 1a and 1b of the rear wheels, the vehicle 21 includes: a brake pedal 22 that is operated by a driver; a master cylinder 23 having a vacuum boosting system that applies pressure to brake fluid while moving an internal piston by operating the brake pedal 22; pipes 24a, 24b, 24c, and 24d that transmit pressure; and disc brake systems 25a and 25b (the configurations of the systems 25a and 25b are different only in terms of the right and left positions, but are the same in mechanism) of front wheels. It should be noted that a fluid pressure control system 27 such as a side slip prevention system that controls fluid pressure is disposed between the master cylinder 23 and the pipes 24 of each wheel.

The disc brake systems 1 (hereinafter, a and b will be omitted because the configurations of the systems 1a and 1b are different only in terms of the right and left positions, but are the same in mechanism) disposed at the rear wheels are so-called floating-type calipers shown in FIG. 1. Each of the systems 1 includes: a carrier 3 having a cylinder supporting member that movably supports, in the axis direction of a disc rotor 2, a cylinder 4 and a fixing member to be fixed to a non-rotating member of the vehicle 21 located on the inner side of the vehicle 21 relative to the disc rotor (rotating member) 2 that rotates together with the wheels; brake pads (pressing members) 5a and 5b having friction members disposed on the both sides of the disc rotor 2; a piston 6 that is slidably provided in the cylinder 4 to press the brake pads; a pressure chamber 7 into which the brake fluid is guided from the pipe 24c to press the piston 6 with the internal pressure; and a motor 8 that drives the piston 6. An output shaft of the motor 8 is connected to a reduction gear 9, an output shaft 13 of the reduction gear 9 is connected to a rotation/linear motion conversion mechanism 10, and the piston 6 can be moved in the linear direction by the rotation/linear motion conversion mechanism 10. Further, the motor 8 is connected to a controller 11 through an electric wire 12. The rotation of the motor 8 is controlled by the controller 11 (controlling unit). Accordingly, the piston 6 is moved by the pressure of the pressure chamber 7, the driving force of the motor 8, and the reaction force from the disc rotor 2.

Figure 3:
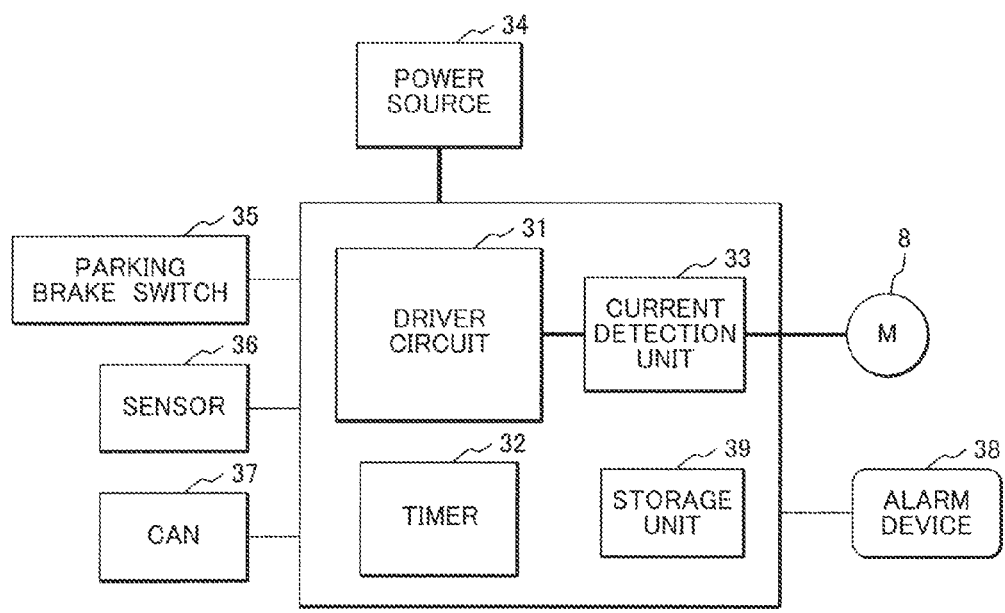
FIG. 3 is a diagram for showing a configuration example of a controller of the brake system.

The controller 11 includes a current detection unit 33 that detects current when driving the motor 8 as shown in FIG. 3. The controller 11 is connected to a parking brake switch 35 operated by the driver, various sensors 36 for acceleration and vehicle speeds, and a CAN 37 that obtains information of the respective units of the vehicle 21 such as information from the fluid pressure control system 27, and controls to supply power to the motor 8 in accordance with each signal. Further, an alarm device 38 such as a warning light is connected to the controller 11 if necessary. Further, the sensors 36 include a power source sensor that detects power and a voltage sensor that detects voltage of the motor.

Next, an operation of the brake system 1 will be described.

First, an operation when the brake system 1 is used as a regular brake will be described. When the driver operates the brake pedal 22, the fluid pressure of the brake fluid is generated by the master cylinder 23, and the piston 6 is propelled by the force of the fluid pressure because the fluid pressure reaches the pressure chamber 7 through the pipes 24. Thus, the disc rotor 2 presses the brake pads 5a and 5b, and the braking force is generated. Further, in the brake system having the fluid pressure control system 27 and the like, the required fluid pressure can be generated by the fluid pressure control system 27 irrespective of the operation of the brake pedal 22 by the driver. As similar to the above, the braking force is generated by the generated fluid pressure.

Next, an operation of the parking brake will be described. The braking force is generated by the driver turning on the parking brake switch 35, or on the basis of an applying command 41 to generate the motor thrust from the parking brake controller 11 by detecting a state of the vehicle. The motor 8 is driven on the basis of the command. The driving force of the motor is transmitted to the piston 6 through the reduction gear 9, the rotation/linear motion conversion mechanism 10, and the like to drive the piston 6. When the piston 6 is driven, the piston 6 abuts on the brake pad 5b as shown in FIG. 1. Further, the cylinder 4 presses the brake pad 5a to the disc rotor 2. As a result, the brake pads 5a and 5b sandwich the disc rotor 2 to generate the braking force. The driving of the motor is stopped when the required braking force is obtained.

Figure 4:
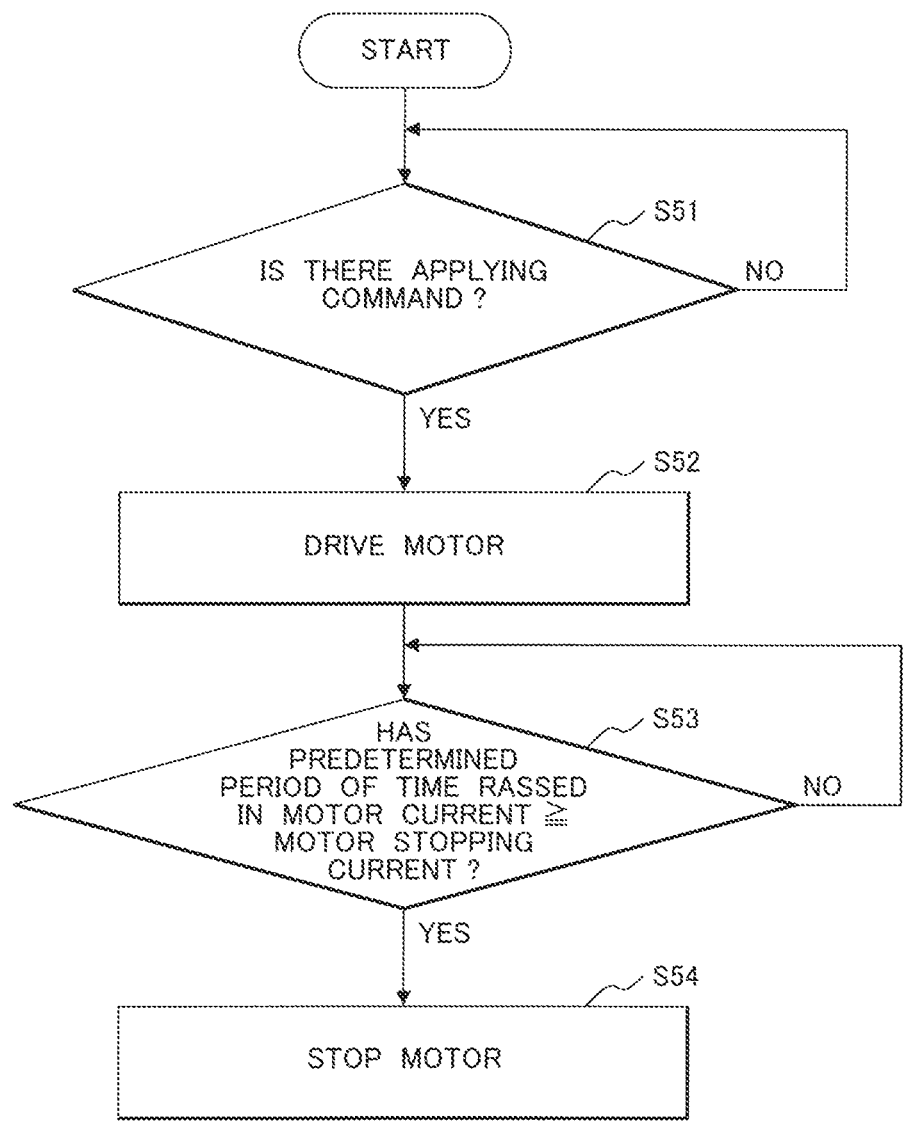
FIG. 4 is a flowchart for explaining a control process for a motor.

A flowchart in this case is shown in FIG. 4. First, when it is determined that there is an applying command (YES in S51), the motor is driven (S52). When it is determined that motor current 43 has exceeded motor stopping current 44 (target value), or a predetermined period of time has passed after the exceeding (YES in S53), the motor is stopped (S54).

Figure 5:
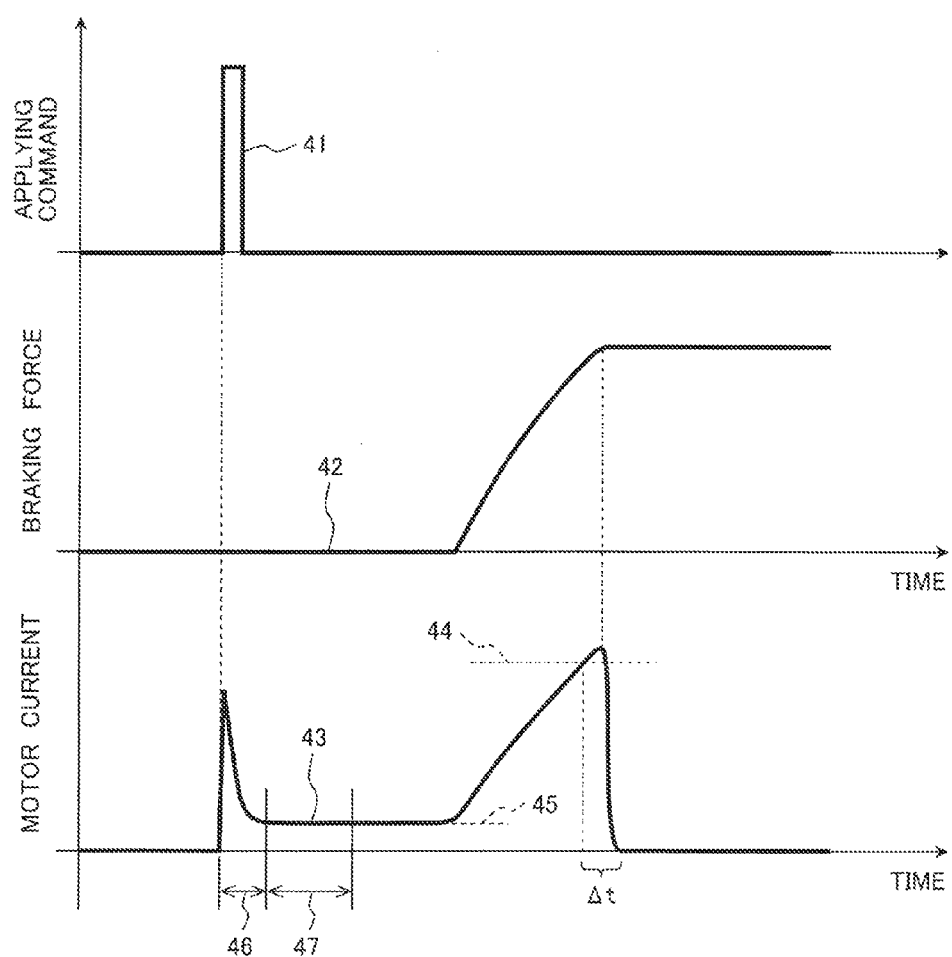
FIG. 5 is a diagram for showing the time waveforms of an applying command, braking force, and motor current.

Further, the time waveforms of the applying command 41, the braking force 42, and the motor current 43 in this case are shown in FIG. 5. When the applying command 41 is input, the motor 8 is driven, and the piston 6 is moved to the direction closer to the brake pad 5b. Then, a gap between the rotation/linear motion conversion mechanism 10 and the piston 6 is eliminated, and the piston 6 idles until the piston 6 abuts on the brake pad 5b. In this case, a load applied to the motor 8 is small, and the motor current 43 is kept at a substantially constant small value (idle running current 45). The motor current converges after inrush current flows immediately after the motor is started to drive, and the current flowing until the piston 6 abuts on the brake pad 5b after the convergence is the idle running current 45.

Thereafter, when the piston 6 abuts on the brake pad 5b, the driving force of the piston 6 is boosted. Accordingly, the pressing force of the brake pad 5b to press the disc rotor 2 is boosted. Further, the load applied to the motor 8 is gradually increased, and the motor current is increased. Then, when predetermined seconds Δt pass after the motor current 43 reaches the motor stopping current 44, the motor is stopped. The motor may be stopped immediately after the motor current 43 reaches the motor stopping current 44.

Figure 9:
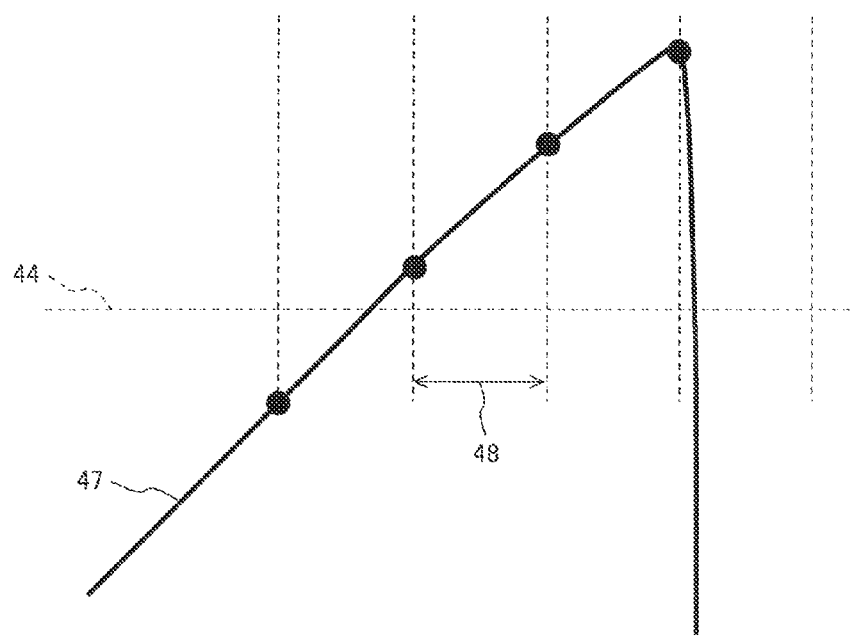
FIG. 9 is an enlarged view in the vicinity of reaching the motor stopping current in the time waveform of the idle running current.

Further, as shown in FIG. 9, current (detected current 47) detected by the sensor is collected in each sampling time 48. Thus, the motor may be stopped when the detected current 47 exceeds the motor stopping current 44 the predetermined number of times (three times in FIG. 9). This process is performed in order to determine whether or not the motor current has certainly exceeded the motor stopping current 47 because the actual motor current is fluctuated due to mechanical loss, the fluctuation of the voltage of the power source, or the like. For example, in the case where the predetermined number of times is three, if current equal to or higher than the motor stopping current 44 is obtained in the first sampling and current lower than the motor stopping current 44 is obtained in the second sampling, the counted number is reset. Then, the process is repeated until the motor current exceeds the motor stopping current 44 three times in a row.

Next, a method of setting the motor stopping current 44 will be described. First, a storage unit 39 stores the idle running current 45 of the motor current 43 before the piston 6 abuts on the brake pad 5b. As the idle running current 45, stored are, for example, the average or the minimum value of the motor current, or a result obtained by filtering using a low-pass filter or the like in an idle running predetermined period of time 47 after the applying command 41 is input while ignoring a predetermined period of time 46 after the applying command 41 is input in which the inrush current is generated, as shown in FIG. 5.

Then, the motor stopping current 44 is set (a motor stopping current setting unit) by referring to the storage unit 39 using the idle running current 45. The storage unit 39 is provided in the controller 11. The storage unit 39 stores a correspondence relation between the idle running current flowing into the motor 8 until the piston 6 abuts on the brake pad 5*b* and the motor stopping current serving as a standard when the supply of the current to the motor 8 is stopped. The relation between the idle running current 45 and the motor stopping current 44 is set so that the rate of change of the motor stopping current relative to the idle running current becomes smaller when the idle running current 45 is small than that when the idle running current 45 is large.

Figure 6:
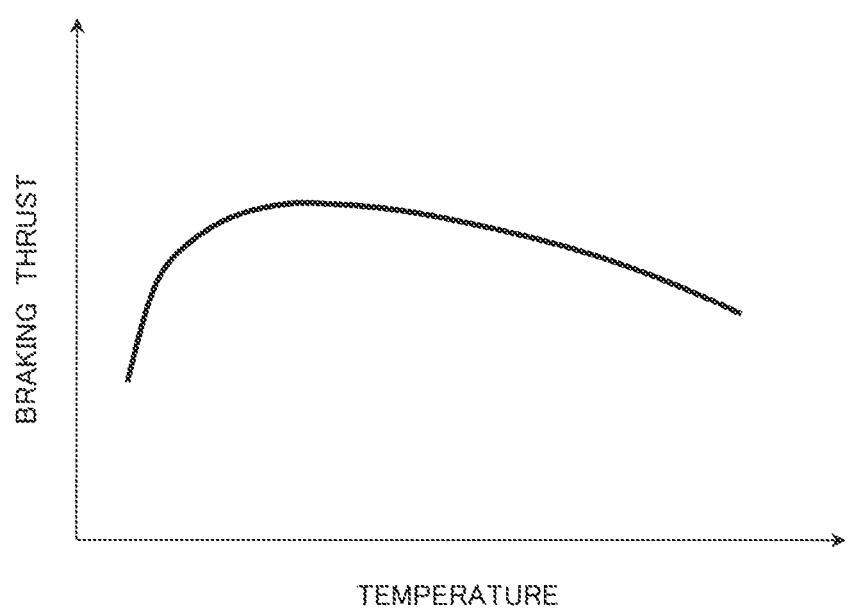
FIG. 6 is a graph for showing a relation between temperature and braking thrust when motor stopping current is constant.
Figure 7A:
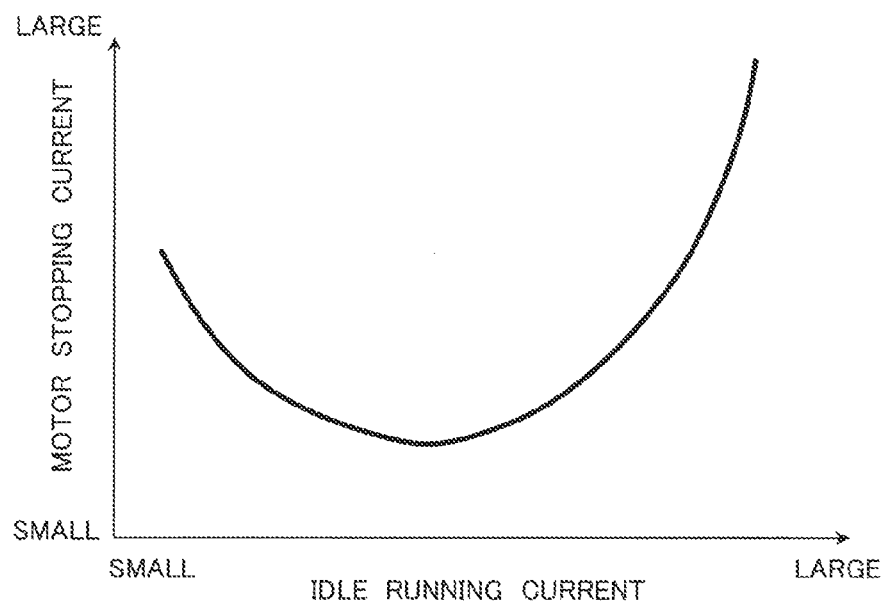
FIG. 7A is a graph for showing an example of a relation between idle running current and the motor stopping current.

For example, as shown in FIG. 7A, as the idle running current 45 is increased, the motor stopping current 44 becomes smaller in a range of small idle running current 45, so that the rate of change of the motor stopping current relative to the idle running current is set to become smaller. On the other hand, as the idle running current 45 is increased, the motor stopping current 44 becomes larger in a range of large idle running current 45, so that the rate of change of the motor stopping current relative to the idle running current is set to become larger. Further, as the idle running current 45 becomes larger, the increased amount of the motor stopping current 44 relative to the increased amount of the idle running current 45 may become larger. Further, the relation between the idle running current 45 and the motor stopping current 44 may be represented using a relation such as a quadratic function or a higher-order function, or a digital stepwise relation. The correspondence relation between the idle running current and the motor stopping current shown in FIG. 7A can be obtained on the basis of the relation between the braking thrust and the temperature of the motor shown in FIG. 6.

On the assumption that the motor current 43 is proportional to the braking force, if the motor 8 stopping current 44 is set at a certain value, the motor can be stopped by the motor thrust in accordance with the required braking force. However, the actual motor thrust includes idle running thrust required at the time of idle running, other than the effective thrust used for the braking force. Further, as the temperature becomes higher due to the influence of the temperature of motor windings, the torque constant becomes smaller in the relation between the motor thrust and current. Accordingly, the motor current 43 and the braking force do not correspond to each other one to one.

Figure 7B:
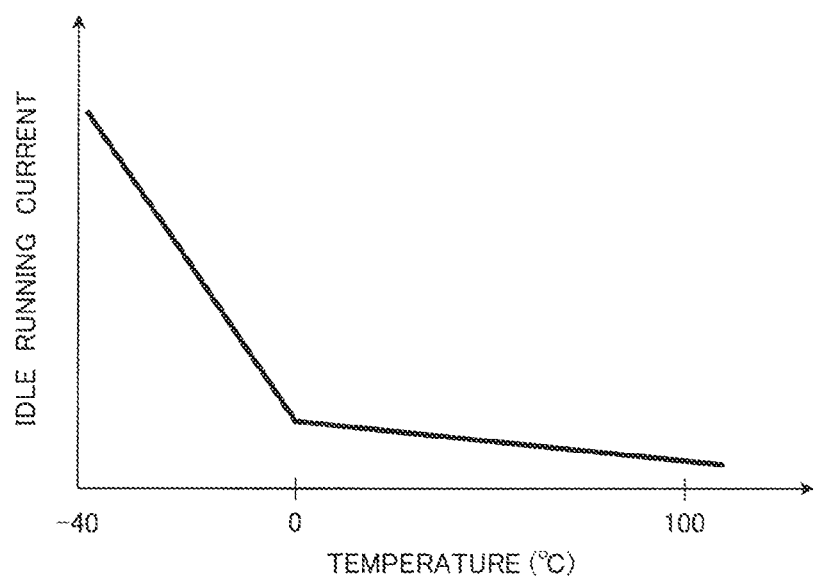
FIG. 7B is a graph for showing an example of a relation between temperature and the idle running current.

On the other hand, the idle running current 45 is changed by the idle running thrust influenced by resistance such as the viscous resistance of grease generated in the reduction gear 9. As the idle running thrust becomes larger, the idle running current 45 becomes larger. Specifically, as the temperature becomes lower, the viscous resistance becomes larger. Thus, as the temperature becomes lower, the idle running current 45 tends to become larger, and as the temperature becomes higher, the idle running current 45 tends to become smaller as shown in FIG. 7B. Further, as the temperature becomes higher, the torque constant of the motor tends to become smaller due to the influence of the increased temperature of motor windings. The thrust generated in the motor tends to become smaller even at the same level of current.

Thus, the braking thrust (braking force) when the motor stopping current is constant is small at low temperatures, is maximized at intermediate temperatures, and is decreased at high temperatures from low temperatures to high temperatures as shown in FIG. 6. If the braking force is larger than necessary, the strength of each unit needs to be increased. Thus, the cost is increased, and the size needs to be enlarged. Accordingly, the braking force is required to be a minimum certain value.

Therefore, the relation between the motor stopping current and the idle running current is set as shown in FIG. 7A. The motor stopping current 44 is increased at high temperatures, is decreased at intermediate temperatures, and is increased at much higher temperatures. Accordingly, in the case where the motor stopping current 44 is constant, the fluctuated braking thrust can be kept substantially constant against temperature changes.

Figure 8:
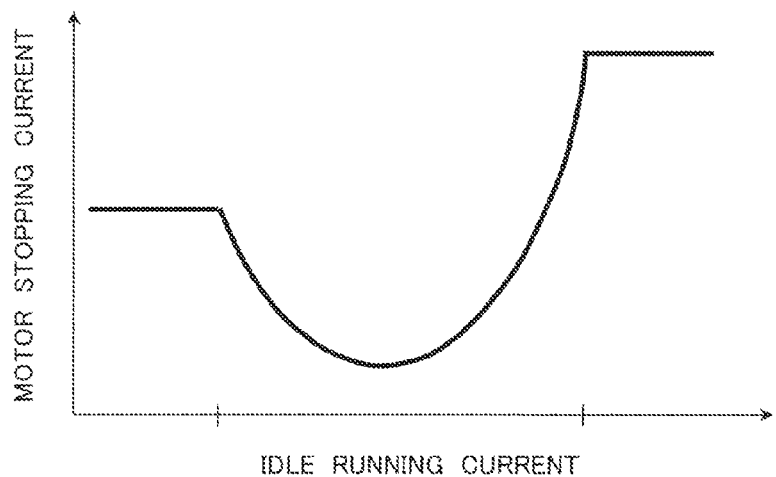
FIG. 8 is a graph for showing another example of a relation between the idle running current and the motor stopping current.

It should be noted that in the case where the idle running current 45 is equal to or smaller than a predetermined value, the motor stopping current 44 may be constant as shown in FIG. 8. The idle running current 45 falls within a specific range due to the changes of a temperature range. However, the idle running current 45 is occasionally detected at a low level outside the range due to errors of the sensors. In this case, the value of the motor stopping current 44 can be prevented from being extremely large. Even when the idle running current 45 is equal to or higher than a predetermined value, the motor stopping current 44 may be constant.

Next, the release of the braking force will be described. The braking force is released by the driver turning off the parking brake switch, or by detecting a state of the vehicle, for example, when detecting the vehicle starting to run. When the braking force is to be released, a motor thrust release command is issued to the motor 8. On the basis of the motor thrust release command, the piston is driven in the direction opposite to that when the braking force is generated. Thus, the pressing force applied to the pads is released, and the braking force is released.

In the present invention as described above, the motor stopping current 44 is changed in accordance with the changes of the torque constant due to the temperature and the changes of viscosity. Thus, the fluctuation of the braking force can be reduced, and the cost can be reduced.

According to the brake system of the present invention, the motor stopping current is set in consideration of the resistance such as the viscous resistance of grease in the reduction gear increased at low temperatures and the torque constant of the electric power motor reduced at high temperatures. Thus, the appropriate braking force can be always generated without influence of temperature. Thus, even if the required braking force is secured at low and high temperatures, the excessive braking force can be prevented from being generated at ordinary temperatures. Therefore, a downsized, low-cost, and highly-reliable configuration can be realized.

Figure 12:
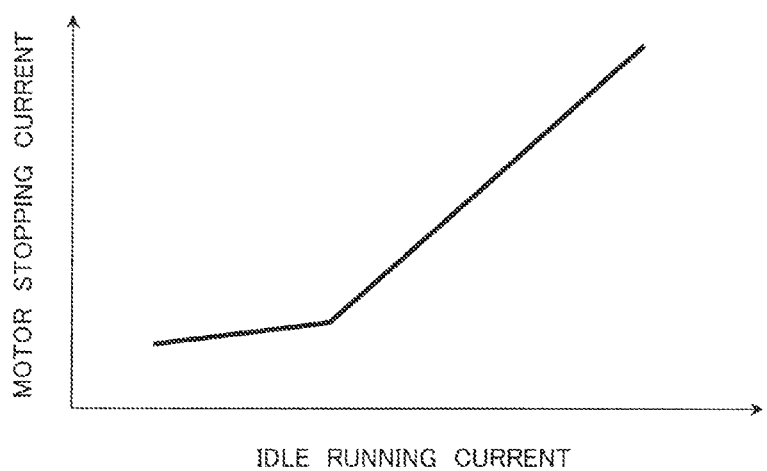
FIG. 12 is a graph for showing another example of a relation between the idle running current and the motor stopping current.

It should be noted that the relation between the motor stopping current and the idle running current is formed in a substantially U-shape as shown in FIG. 7A in consideration of both of the changes of the torque constant due to the temperature and the changes of the viscosity of grease in the reduction gear in the first embodiment. However, for example, when only the viscous resistance of grease in the reduction gear increased at low speeds is considered, the relation between the motor stopping current and the idle running current may be set so that the rate of change of the motor stopping current relative to the idle running current becomes small in a range of small idle running current and the rate of change of the motor stopping current relative to the idle running current becomes large in a range of large idle running current as shown in FIG. 12. In this case, the rate of change of the motor stopping current relative to the idle running current is increased in two steps.

Second Embodiment

Next, a second embodiment of a brake system according to the present invention will be described using FIG. 10. It should be noted that only the method of setting the motor stopping current 44 is changed in the second embodiment. Thus, constitutional elements having the same configurations and functions as those of the disc brake system 1 already described using FIG. 1 to FIG. 9 are given the same reference numerals below, and thus the concrete explanation will not be repeated.

Figure 10:
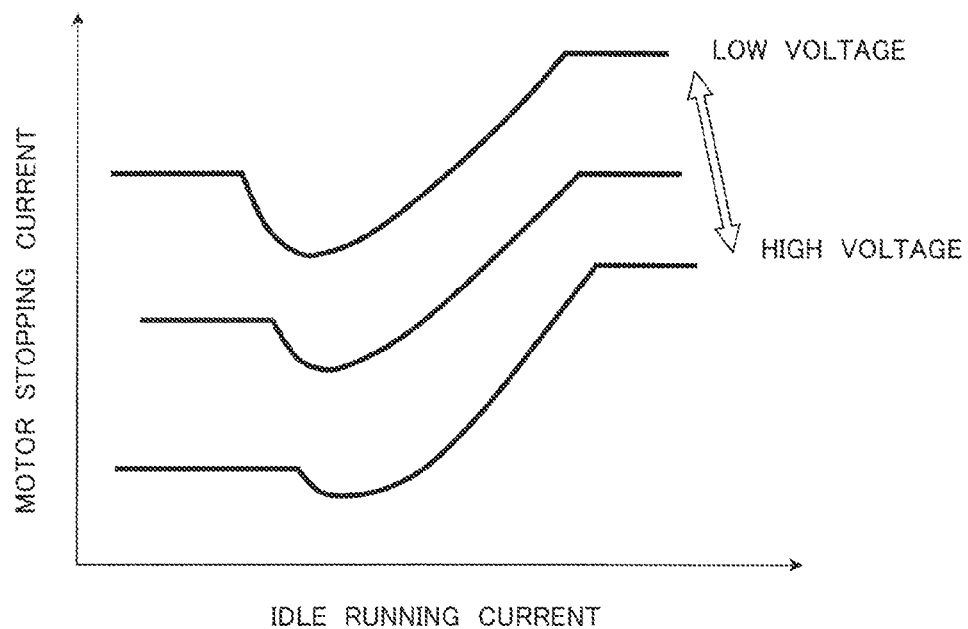
FIG. 10 is a graph for showing a relation between the idle running current and the motor stopping current.

FIG. 10 shows a relation between the idle running current 45 and the motor stopping current 44 in the second embodiment. As shown in FIG. 10, the relation between the idle running current 45 and the motor stopping current 44 is changed in accordance with voltage. Voltage maps of three patterns are provided in the drawing, and may be interpolated using a predetermined function.

For example, in the case where the motor 8 is stopped when the motor current 43 has exceeded the motor stopping current 44 the predetermined number of times as described above, the motor current 43 is increased during the time of the predetermined number of times, and the actual current when the motor 8 is stopped is changed even in the case of the same motor stopping current 44. As a major factor, the motor current 43 is differently increased due to the difference of the rotational speed of the motor 8. The rotational speed of the motor 8 is dependent on the voltage of the motor. As the voltage becomes higher, the speed becomes faster.

Accordingly, a map is provided for each voltage, and the required motor stopping current 44 is differently set. Specifically, as shown in FIG. 10, the motor stopping current 44 is set to be low at a high level of voltage, and the motor stopping current 44 is set to be high at a low level of voltage. Accordingly, the actual current when the motor is stopped is stopped where the required braking force is obtained irrespective of voltage. The voltage of the motor or the voltage of the battery that is not largely different from the voltage of the motor may be input to the controller 11. According to the embodiment, the excessive thrust of the brake system 1 can be suppressed irrespective of voltage and temperature.

Third Embodiment

Next, a third embodiment of a brake system according to the present invention will be described using FIG. 11.

It should be noted that only the method of setting the motor stopping current 44 is changed in the third embodiment. Thus, constitutional elements having the same configurations and functions as those of the disc brake system 1 already described using FIG. 1 to FIG. 9 are given the same reference numerals below, and thus the concrete explanation will not be repeated.

Figure 11:
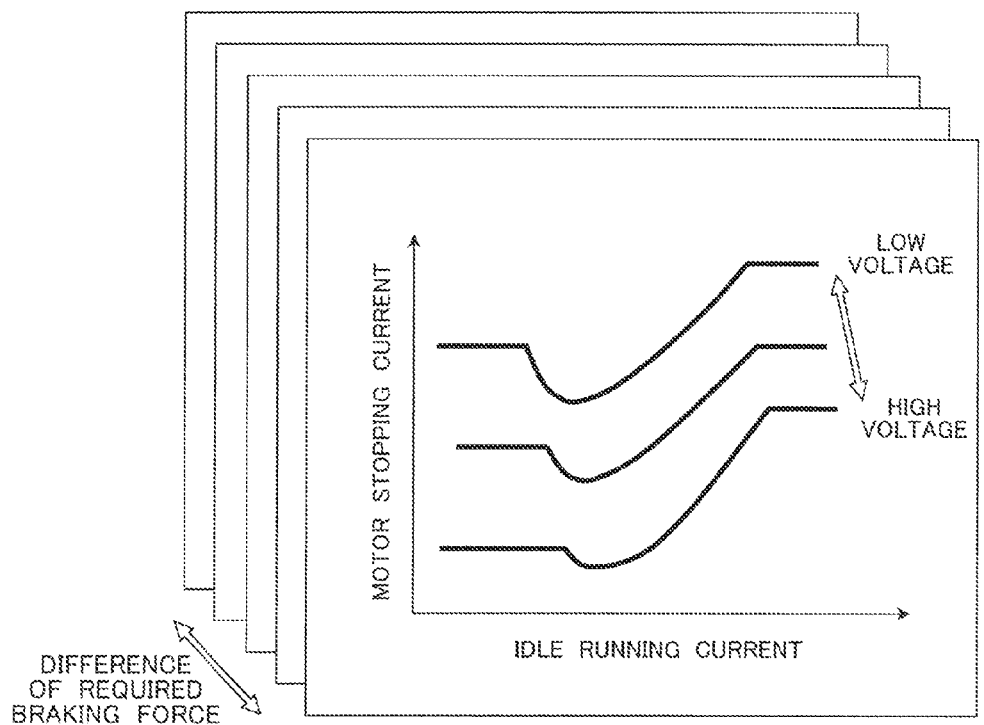
FIG. 11 is a graph for showing a relation between the idle running current and the motor stopping current.

FIG. 11 is a diagram for explaining a method of setting the motor stopping current 44. In addition to the difference of voltage in the second embodiment, the motor stopping current 44 is changed depending on the required braking force in the third embodiment. The required braking force is changed depending on the inclination of roads, or the like in some cases. Therefore, these relations are obtained for each required braking force, and thus the excessive braking force can be suppressed relative to each required braking force. According to the embodiment, the excessive braking force can be suppressed for each required braking force irrespective of voltage and temperature.

It should be noted that an example in the case of the disk brake has been described above as the embodiments. However, the brake system of the present invention can be applied to a drum brake. Further, the brake system of the present invention is not limited to vehicles such as automobiles, but can be used for objects that are required to generate the braking force.

As described above, the reduction of the torque constant at high temperatures is not considered in the conventional technique. Thus, if the set current value is merely changed proportional to the atmosphere temperature, there is a possibility that the predetermined braking force cannot be obtained. Further, in order to detect the atmosphere temperature, additional devices for detecting the temperature such as the outside temperature, the exhaust temperature, or the water temperature of cooling water are necessary, resulting in an increase in cost. Further, it is necessary to estimate the temperature of an actuator using these additional devices. Thus, it is necessary to take the accuracy of the estimation into account. However, according to the embodiments, it is possible to provide an electric power brake with a simple structure that can generate appropriate braking force without additional sensors and without influence of temperature.

The embodiments of the present invention have been described above in detail. However, the present invention is not limited to the above-described embodiments, and the designs can be variously changed without departing from the spirit of the present invention described in claims. For example, the above-described embodiments have been described in detail to understandably explain the present invention, and are not necessarily limited to those having the all configurations described above. Further, a part of the configuration in one embodiment can be replaced by a configuration of another embodiment, and the configuration in one embodiment can be added to that in another embodiment. In addition, a part of the configuration in each embodiment can be added to or replaced by another, or deleted.

What is claimed is:

1. A brake system that presses pressing members to a rotary member to control the rotation of the rotary member, the system comprising:
   a piston that can be moved in the pressing direction of the pressing members;
   a motor that moves the piston with the supply of a power source;
   a current detection unit that detects current flowing in the motor;
   a storage unit that stores a correspondence relationship between idle running current flowing in the motor from the time the piston is started to move to the time the pressing members are started to be pressed and motor stopping current serving as a standard when the supply of current to the motor is stopped;
   a motor stopping current setting unit that sets the motor stopping current by referring to the storage unit using the idle running current; and
   a control unit that stops the supply of current to the motor when the current flowing in the motor reaches the motor stopping current, wherein
   the correspondence relationship is set in the storage unit so that the rate of change of the motor stopping current relative to the idle running current becomes smaller when the idle running current is small than that when the idle running current is large.

2. The brake system according to claim 1, wherein
   the correspondence relation is set in the storage unit so that as the idle running current is increased, the motor stopping current becomes smaller in a range of small idle running current, and as the idle running current is increased, the motor stopping current becomes larger in a range of large idle running current.

3. The brake system according to claim 2, wherein the correspondence relation is set in the storage unit so that the increased amount of the motor stopping current relative to the increased amount of the idle running current becomes larger in a range of large idle running current.

4. The brake system according to claim 3, wherein the correspondence relation is set in the storage unit on the basis of the temperature of the motor and the temperature of a reduction gear.

5. The brake system according to claim 4, wherein the temperature of the motor is estimated on the basis of the current flowing in the motor.

6. The brake system according to claim 4, wherein when the temperature of the reduction gear is equal to or smaller than a predetermined value, as the idle running current becomes larger, the motor stopping current is set to become larger.

7. The brake system according to claim 3, wherein the storage unit includes a first area, a second area, and a third area for the idle running current in ascending order, the rate of change of the motor stopping current relative to the idle running current in the first area is substantially 0, and the rate of change of the motor stopping current relative to the idle running current in the second area is smaller than the rate of change of the motor stopping current relative to the idle running current in the third area.

8. A brake system comprising:
pressing members that apply braking force to a vehicle by pressing a rotor rotated together with a wheel;
a piston that moves the pressing members towards the rotor, or in a direction away from the rotor;
a motor that moves the piston with a supply of current;
a reduction gear that transmits the power of the motor to the piston;
a detection unit that detects idle running current flowing after inrush current flowing immediately after the motor is started to be driven is converged; and
a control unit that generates the braking force for the vehicle by driving the motor, and then stops the motor under a completion condition in which the pressing force of the pressing members to the rotor reaches a target value at which the driving of the motor is stopped, wherein
the control unit sets the target value on the basis of the changes of a torque constant of the motor and the changes of the resistance of the reduction gear.

9. A brake system comprising:
pressing members that apply braking force to a vehicle by pressing a rotor rotated together with a wheel;
a piston that moves the pressing members towards the rotor, or in a direction away from the rotor;
a motor that moves the piston with a supply of current;
a detection unit that detects idle running current flowing after inrush current flowing immediately after the motor is started to be driven is converged;
a temperature estimation unit that estimates the temperature of the motor on the basis of current flowing in the motor; and
a control unit that generates the braking force for the vehicle by driving the motor, and then stops the motor under a completion condition in which the pressing force of the pressing members to the rotor reaches a target value at which the driving of the motor is stopped, wherein
when the temperature of the motor is equal to or smaller than a predetermined value, the control unit sets the target value to become larger as the idle running current becomes larger.

* * * * *